United States Patent [19]

Affeldt et al.

[11] Patent Number: 5,431,273

[45] Date of Patent: Jul. 11, 1995

[54] APPARATUS AND METHOD FOR DETECTING A MISSING EJECTOR IN A SORTING AND CONVEYING SYSTEM

[75] Inventors: Henry A. Affeldt, Victorville; Tim D. Conway, Stockton, both of Calif.

[73] Assignee: Sunkist Growers, Inc., Ontario, Calif.

[21] Appl. No.: 201,511

[22] Filed: Feb. 24, 1994

[51] Int. Cl.6 .............................................. B65G 47/46
[52] U.S. Cl. ........................... 198/370.04; 198/502.1; 198/810.02; 209/652
[58] Field of Search ............... 198/365, 370, 372, 367, 198/464.4, 482.1, 483.1, 502.1, 779, 810; 209/651-654, 912

[56] References Cited

U.S. PATENT DOCUMENTS

| | | | |
|---|---|---|---|
| 4,274,783 | 6/1981 | Eineichner et al. | 198/365 |
| 4,437,563 | 3/1984 | Oriol | 198/810 |
| 5,042,637 | 8/1991 | LaVars et al. | 198/372 |
| 5,174,429 | 12/1992 | LaVars et al. | 198/372 |
| 5,236,075 | 8/1993 | Bartmann | 198/810 |
| 5,244,100 | 9/1993 | Regier et al. | 198/365 |
| 5,263,570 | 11/1993 | Stonemark | 198/502.1 |
| 5,306,877 | 4/1994 | Tas | 198/365 |

*Primary Examiner*—Joseph E. Valenza

[57] ABSTRACT

The conveyor system is comprised of a plurality of spools connected by chains at each end of the spool. The space between an adjacent pair of spools defines a pocket. An ejector is carried by the chain within each pocket to eject fruit from the pocket. The ejectors are selectively activated by solenoids lying underneath the chain and mounted on a conveyor channel across which the chain and spools are pulled. A photooptical detector is provided for detecting when an ejector is missing due to damage or other loss. A system control circuit detects the missing ejector and stops the conveyor at a predetermined position so that the missing ejector stops at a predetermined repair location on the conveyor system.

16 Claims, 8 Drawing Sheets

APPARATUS AND METHOD FOR DETECTING A MISSING EJECTOR IN A SORTING AND CONVEYING SYSTEM

BACKGROUND OF THE INVENTION

1. Field of the Invention

The invention relates to conveyor systems for handling objects, such as fruit, in which ejector levers are incorporated into a conveyor chain. The invention relates specifically to an apparatus and method for detecting missing ejectors in such a conveyor system and for automatically adjusting the chain stretch of the conveyor as the chain conveyor systems wears.

2. Description of the Prior Art

The sorting, grading, separation and handling of any object such as fruit, and in particular citrus fruits, on conveyor systems in combination with many types of fruit handling apparatus is well known. In one type of conveyor system, the conveyor is comprised of two chains which are driven along each side of a conveyor line. Mounted between the two chains is a plurality of spools for defining pockets between the spools and for spinning the fruit which are nested in the pockets. The fruit is loaded onto the conveyor from a bin or other source and through various conventional means is ultimately sorted so that substantially only one item of fruit lies in the pocket between two adjacent spools on the conveyor line. As the fruit is sorted, graded or otherwise handled, it is necessary to selectively remove the fruit from the conveyor line at designated pockets. The means provided for selective designation includes an ejector finger carried on the conveyor and positioned beneath the pocket between the two spools. Ejector finger is activated at preselected positions according to the fruit sorting, grading or handling application which is being undertaken and selectively rotated to lift or eject the fruit from the pocket into a sorting bin to the side of the conveyor. A description of this type of conveyor may be found in U.S. Pat. No. 5,174,429 assigned to the assignee of the present application, which is expressly incorporated herein by reference.

As it often happens, the conveyor runs at fairly high speeds and for long periods of time. From time to time, an ejector may fail or break. Typical conveyor lines may extend up to 100 feet with an interspool spacing of 3.75 inches. Therefore, it is not uncommon to have as many as 400–800 ejector fingers incorporated within a conveyor line in a typical application. Even if a very small percentage of these fingers are damaged or otherwise fail to operate, the number of fruit which will then be inappropriately processed or not processed at all can become significant over time.

It should also be borne in mind that the conveyor system is an endless loop. Therefore, approximately half the conveyor system is exposed on the top side of the conveyor while the remaining half is disposed under the conveyor line upside down on the return path of the loop. The underside portion of the conveyor system is generally visually and physically difficult to access. Therefore, at any one time only approximately half or less the conveyor and the ejector fingers can be viewed or easily accessed. Should a finger fail, it can be a time consuming task to find which of the pockets contains the malfunctioning or missing ejector finger.

Furthermore, it also must be kept in mind that processing of fruit or other items on the conveyor is based upon a position and time coincidence of the fruit in the conveyor line. The time is usually controlled by an electronic circuit with fixed timing, which is based upon the assumption that there is a certain unit distance or spool-to-spool distance which is substantially constant along the length of the conveyor and during the lifetime of the conveyor. However, in reality each of the elements and parts of the conveyor chain, even when made out of metal, gradually wear and the tolerances of the pieces increase. While the change in any one part is very small, the changes accumulate along the linear length of the chain such that "chain stretch" can be observed. The consequence of chain stretch is that the assumed positions of the pockets between the spools in the conveyor end up in different locations at different times from what originally existed when the conveyor system was new. The conveyor becomes unsynchronized and can begin to malfunction. In some cases chain stretch of as much as an entire pocket length or spool-to-spool distance can occur.

Therefore, what is needed is some type of apparatus and method in which missing or broken ejectors in a conveyor system can be automatically determined and located and wherein chain stretch can be automatically diagnosed and adjusted.

BRIEF SUMMARY OF THE INVENTION

The invention is directed to an apparatus and method for improved detection of missing or malfunctioning ejectors and ejector solenoids, and for providing detection and adjustment of chain stretch.

In the illustrated embodiment, the conveyor system includes one or more lines and each line includes a pair of endless chains. Each chain is cross connected by pins which rotatably carry spools. The distance between spools defines a pocket. Connected to the chains and mounted in the pocket between each pair of spools is an ejector. The ejector is rotatably coupled to and carrier on a pin connected to the chain, so that it can be activated by a solenoid fixed to the channel as the ejector passes. When activated, the ejector will be rotated upwardly thereby forcing an arm against any fruit or object contained in the pocket between the spools. The fruit will then be ejected to the side of the conveyor.

The invention is particularly directed to a mechanism and method for detecting missing ejectors and for positioning conveyor chain so that the missing item is stopped at a readily accessible repair location within the conveyor system. A photo-optical sensor is provided to detect activation of the ejectors. A selected solenoid assembly next to the ejector sensor is continuously activated during a run of conveyor without fruit. The sensor will detect if any ejector has failed to be activated and will automatically stop the conveyor system at a predetermined time after the detection to bring the missing item into a readily accessible repair location.

During operation of the conveyor system with fruit on the conveyor, an over-the-end sensor senses if any fruit passes over the end of the conveyor, which may have been inappropriately missed and thus not properly ejected from the conveyor. By noting the periodicity and timing of the over-the-end fruit, missing ejectors or inoperable solenoids can be identified, and again the conveyor system is automatically brought to a stop at a predetermined location in order to bring the missing ejector into the repair location or at least to identify which of the solenoids is inoperative.

Further, during operation of the conveyor system, the pins passing through the spools are detected by a conveyor sensor at one end of the conveyor line and a chain stretch sensor at the opposing end of the conveyor line. When initially installed, these two sensors are positioned at opposing ends of the conveyor line so that the two spool pins are detected by them at the same or nearly same instant in time. As the chain stretches or wears, the time interval between the two sensor outputs will no longer be simultaneous or nearly simultaneous, but will begin to increase. When this interval has reached a predetermined limit, a warning signal is generated. The operator of the system may then shut the conveyor system down and reposition each of the ejector solenoids at an appropriate readjusted location to compensate for the chain stretch, or the timing of the ejector solenoids can be automatically readjusted through a software diagnostic.

More rigorously, the invention is an apparatus for the detection of malperformance in a conveyor system used for sorting objects. The apparatus comprises a plurality of ejectors carried by the conveyor system for ejecting the objects from the conveyor system. A solenoid assembly activates selected ones of the plurality of ejectors. A missing-ejector sensor disposed proximate to the conveyor system detects activation of the plurality of ejectors by the solenoid assembly. A computer controls the conveyor system to selectively position one of the plurality of ejectors detected by the missing-ejector sensor if the ejector has malperformed. As a result, malperforming and missing ejectors can be identified and positioned for access.

In the illustrated embodiment, the computer controls the solenoid assembly in the conveyor system so that each of the plurality of ejectors is sequentially tested for operation and its performance detected by the missing-ejector sensor.

The conveyor system has a return end and a plurality of the solenoid assemblies. The apparatus further comprises an over-the-end sensor disposed proximate to the conveyor system to detect objects passing over the return end of the conveyor. The computer is coupled to the over-the-end sensor to determine, by periodicity and timing of objects detected by the over-the-end sensor, which one of the plurality of solenoid assemblies or ejectors is malperforming.

The conveyor system further comprises a chain carrying the ejectors. The chain includes a plurality of periodically spaced indicial pins. The apparatus further comprises a chain stretch sensor for detecting the indicial pins and a reference sensor for detecting the indicial pins. The reference sensor is disposed in the conveyor system at a reference position relative to the chain stretch sensor. The computer initially establishes a timing between detections by the chain stretch sensor and the reference sensor of the indicial pins. The computer continuously monitors the timing between the chain stretch sensor and reference sensor to detect changes in the timing indicative of chain stretch.

In the illustrated embodiment, the chain stretch sensor and reference sensor are disposed in the conveyor systems so that the indicial pins are substantially simultaneously sensed by the chain stretch sensor and reference sensor. Any departure from simultaneity indicates chain stretch.

In another embodiment the computer compares the timing against an alarm limit and generates an alarm when the limit has been reached.

In the illustrated embodiment the apparatus further comprises a plurality of solenoid assemblies for activating the ejectors at a corresponding plurality of sorting positions within the conveyor system. The computer provides an activating signal to each of the plurality of solenoid assemblies to selectively operate the ejectors at each of the sorting positions within the conveyor system. The computer responds to the alarm to retime activation of each of the solenoid assemblies in response to chain stretch.

The invention is also a method for detecting missing ejectors in a conveyor system for sorting objects, comprising the steps of: activating each of the ejectors at a predetermined position within the conveyor system; detecting the activation of each of the ejectors at the predetermined position; and controlling the conveyor system to position a selected ejector at a predetermined repair position when failure of proper activation is detected. As a result, operability of the plurality of ejectors within the conveyor system is quickly and easily determined, with the conveyor system configured to permit immediate inspection and repair.

The conveyor system has a plurality of sorting positions, and the method further comprises the steps of detecting objects disposed over the return an end of the conveyor system. From the timing and periodicity of detection of the over-the-end objects, the actual one of the plurality of sorting positions which is malperforming is identified.

The method further comprises the step of detecting chain stretch within the conveyor system, by monitoring the timing between a chain stretch sensor and reference sensor to detect and compensate for deviations from an established norm.

This method still further comprises the steps of selectively activating the plurality of ejectors on the conveyor system with a predetermined timing to sort the objects at a plurality of predetermined sorting positions within the conveyor system. The timing of activation of the plurality of ejectors is selectively altered according to detection of the chain stretch. In the illustrated embodiment the step of selectively altering the timing is performed simultaneously with operation of the conveyor system.

The invention may be better visualized by now turning to the following drawings wherein like elements are reference by like numerals.

The invention and its various embodiments may now be understood by turning to the following detailed description.

DETAILED DESCRIPTION OF THE PREFERRED EMBODIMENTS

Typically, the conveyor system of the preferred embodiment is comprised of a plurality of spools connected by chains at each end of a spool. Alternatively, the system may comprise a single chain. The space between a successive pair of spools defines a pocket. An ejector is carried by the chain within each pocket to eject fruit from the pocket. The ejectors are selectively activated by solenoids lying underneath the chain and mounted on a conveyor channel across which the chain and spools are pulled. A photooptical detector is provided for detecting when an ejector is missing due to damage or other loss. A system control circuit detects the missing ejector and stops the conveyor at a predetermined position so that the missing ejector stops at a predetermined repair location on the conveyor system.

An over-the-end detector detects whether fruit passes over the return end of the conveyor and has not been otherwise ejected from the conveyor system. Depending upon the periodicity and the timing in which fruit passes over the end of the conveyor, it can be determined whether one or more ejectors are damaged, or whether ejectors or solenoids are inoperable, and in each case which one.

During operation, chain stretch is measured between two sensors at each end of the conveyor system. When the stretch has exceeded a predetermined limit, a warning signal is generated, and the conveyor system can be stopped to allow appropriate repositioning of the solenoid assemblies for activating the ejectors or the timing of the firing of the ejectors automatically readjusted by software control.

The invention is herein described in the environment of a fruit handling apparatus and method, but it is expressly to be understood that any material object or thing may be the subject of the invention. Therefore, wherever "fruit" is described, it should be understood to include within its scope any type of object.

THE CONVEYOR SYSTEM MECHANICS

Figure 1:
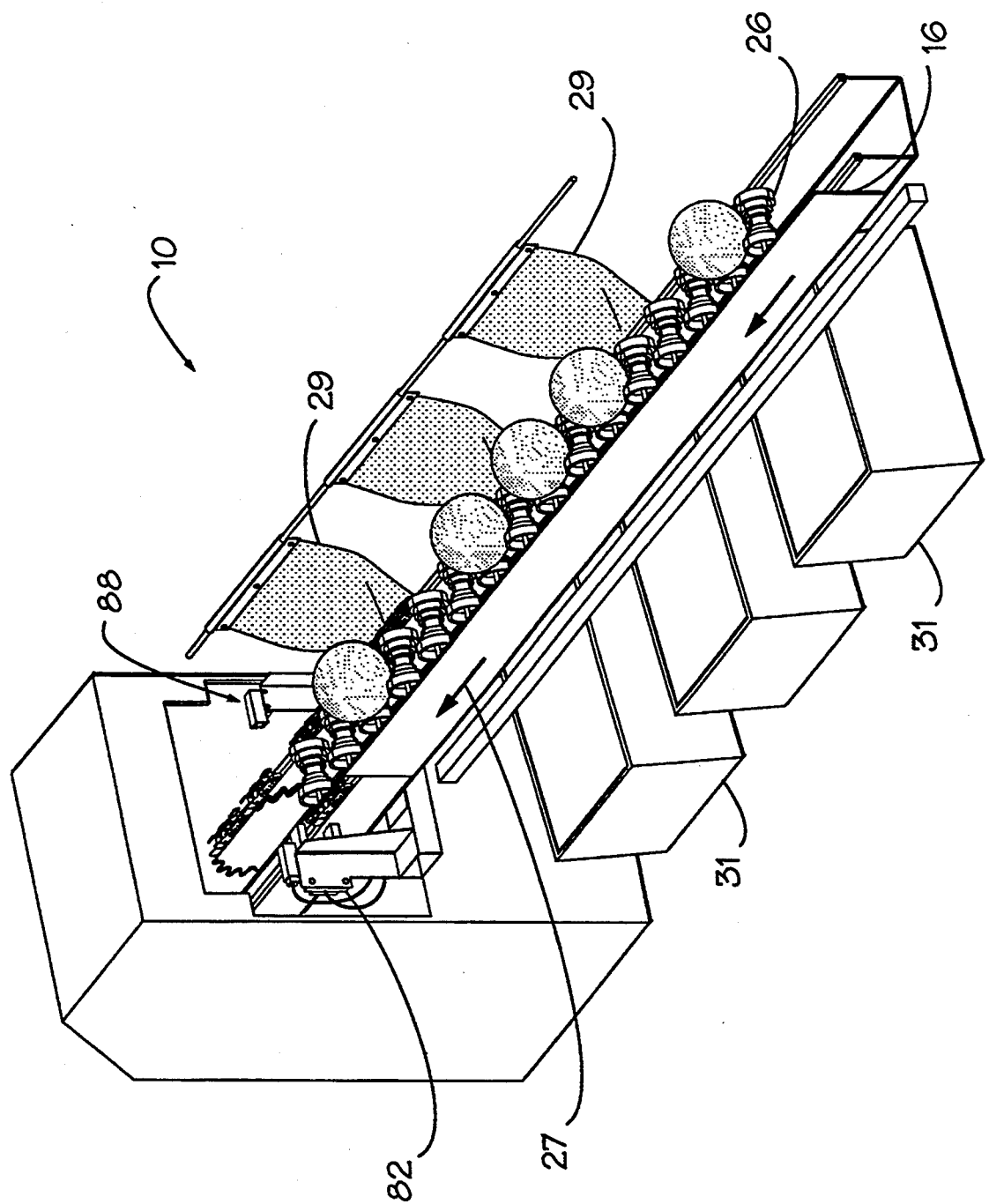
FIG. 1 is a perspective view of a conveyor system in which the improvement of the invention has been made.
Figure 7:
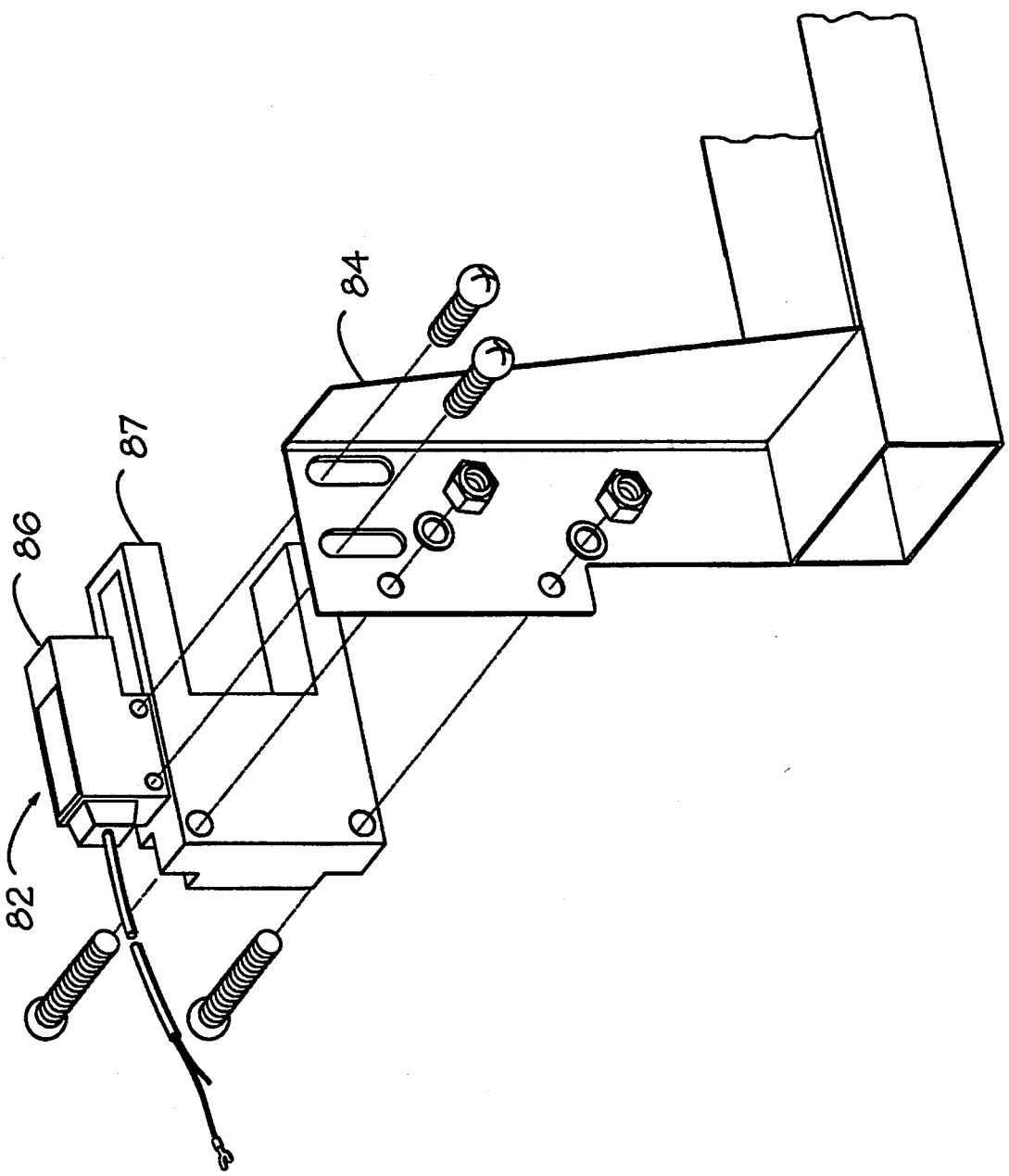
FIG. 7 is a perspective view of a detector assembly shown in enlarged scale utilized in combination with the conveyor system of FIGS. 1-3 showing a spool pin detector and a missing lifter detector.
Figure 8:
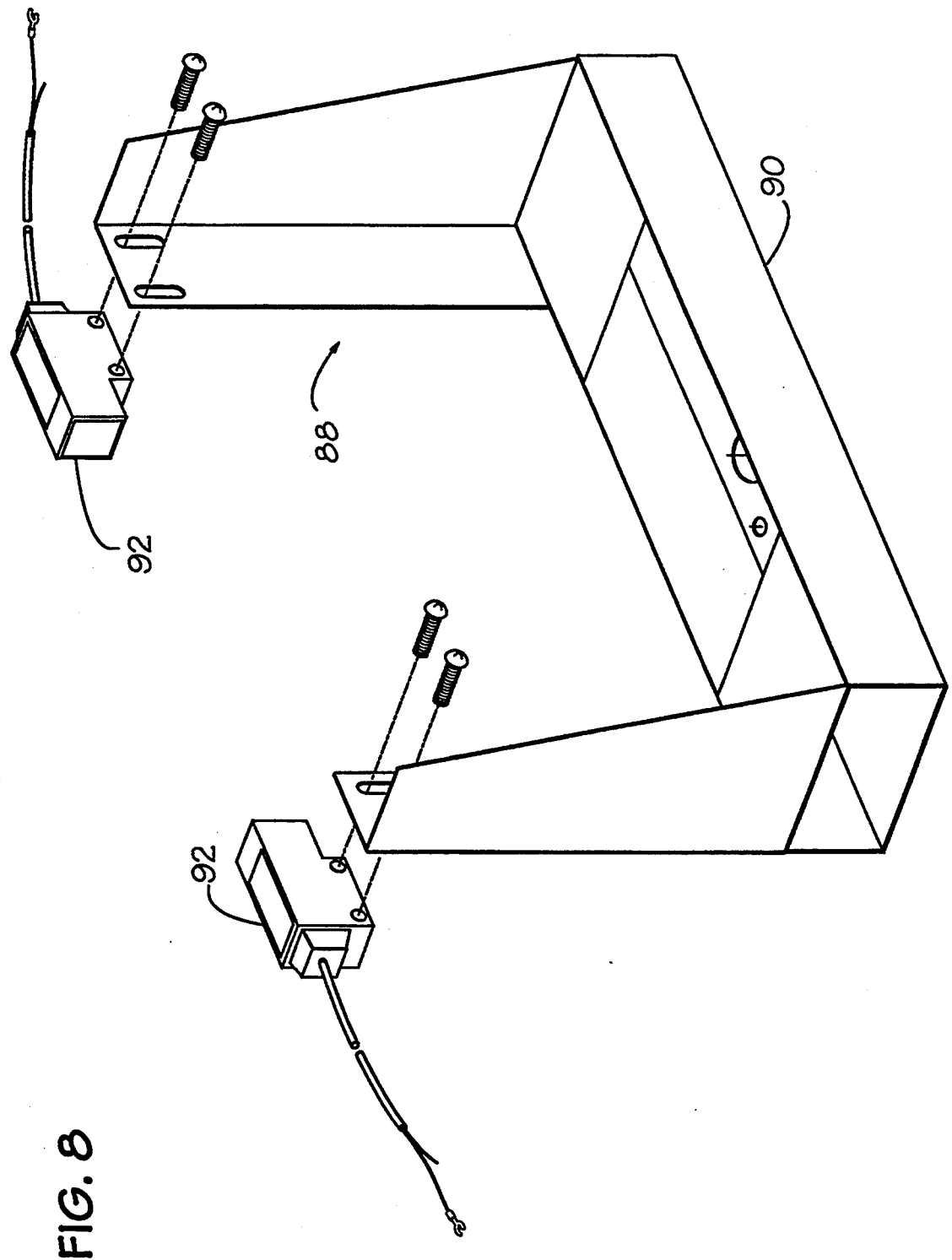
FIG. 8 is an exploded, perspective view of a detector assembly shown in enlarged scale utilized in combination with the conveyor system of FIGS. 1-3 showing an over-the-end detector.

FIG. 1 is a perspective view of a conveyor system in which the improvement of the invention has been made. Spools 26 move in the direction of arrow 27 along channel 12. Fruit will be selectively ejected after being processed by a device upstream on the conveyor line by ejectors, described below against a backboard 29. Backboard 29 is a curved sheet which then directs the fruit into a corresponding sorting bin 31 disposed beneath conveyor 10. A detector 88, shown in greater detail in FIG. 8, is placed at or near the downstream end of conveyor 10 to detect over-the-end fruit. A sorting bin, not shown, similar to bins 31 collects fruit, which passes off the conveyor end. One of the chain pin detectors 82, shown in greater detail in FIG. 7, is also disposed at or near detector 88.

Figure 2:
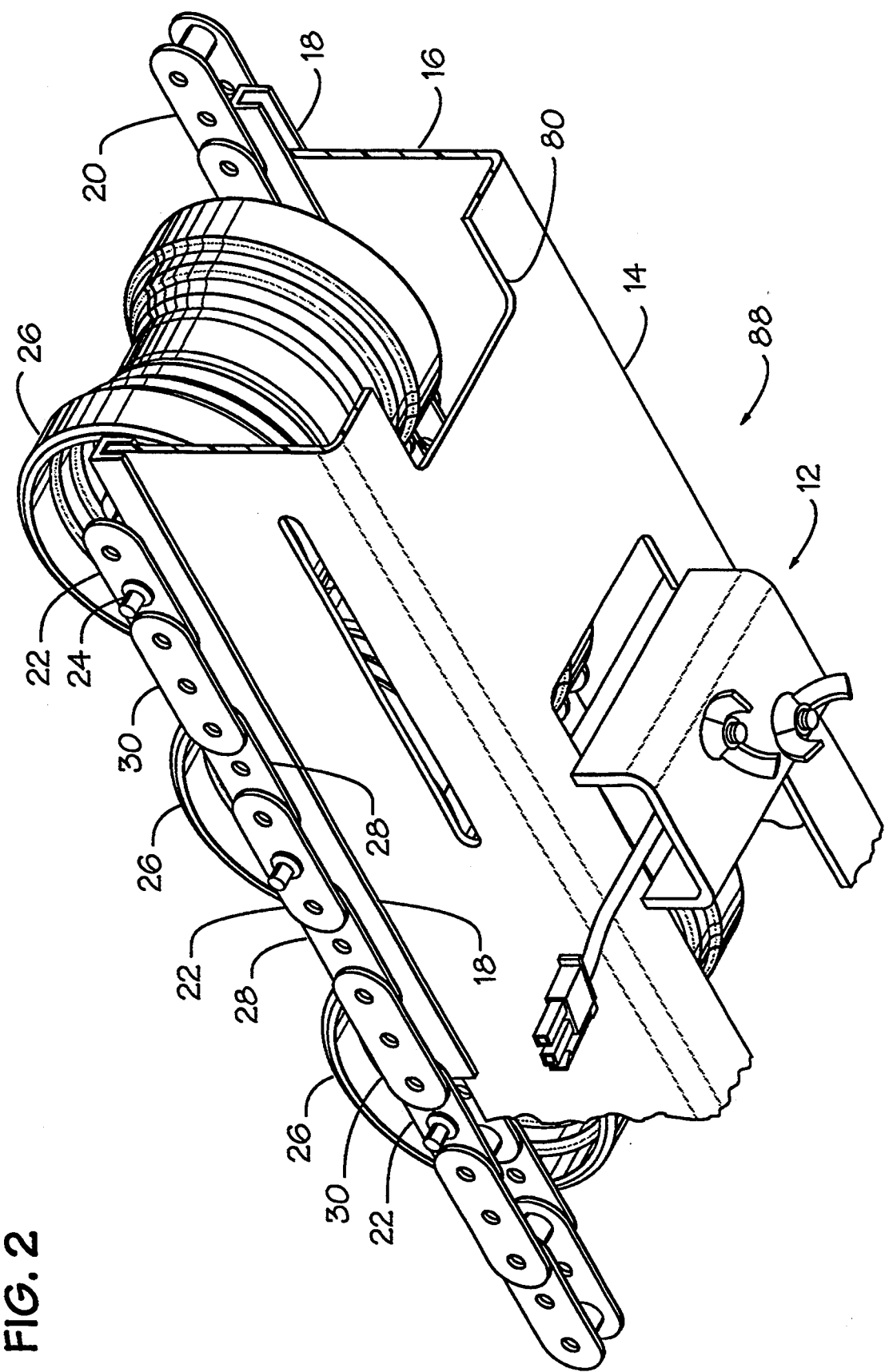
FIG. 2 is a partially cut away perspective view in enlarged scale of a section of the conveyor as seen from an angle below the conveyor.

FIG. 2 is a perspective partially cut away view of a section of conveyor 10 shown in isolation of other elements related to the conveyor line, such as bins 31 and backstops 29. Conveyor 10 typically includes sections of rigid channel 12 which in the illustrated embodiment is seen in the cut away view of FIG. 2 at the right end of the figure. The channel 12 comprises a U-shaped channel having the plurality of cutouts defined in its lower wall 14 and its two vertically extending side walls 16. A bearing rail 18 of lubricated plastic or Teflon is disposed on the top of side walls 16 and provides a smooth raceway on which a metal link chain 20 rests. Chain 20 is comprised of individual links 22 which carry center pins 24 each of which serves as an axis for a spinning or rotatable spool 26. Pin 24 is captively retained within link 22 by conventional means such as a C-clip and washers snapped into a detent groove defined in pin 24.

Spool link 22 is coupled at its left end, as shown in FIG. 2, to a first interconnecting link 28 and then to a second interconnecting link 30. Thus, each spool 26 is spaced by two connecting links 28 and 30 from the next adjacent spool link 22. Ejector fingers 32 as shown in FIG. 3 are disposed inside channel 12 and between the adjacent spools 26.

Figure 3:
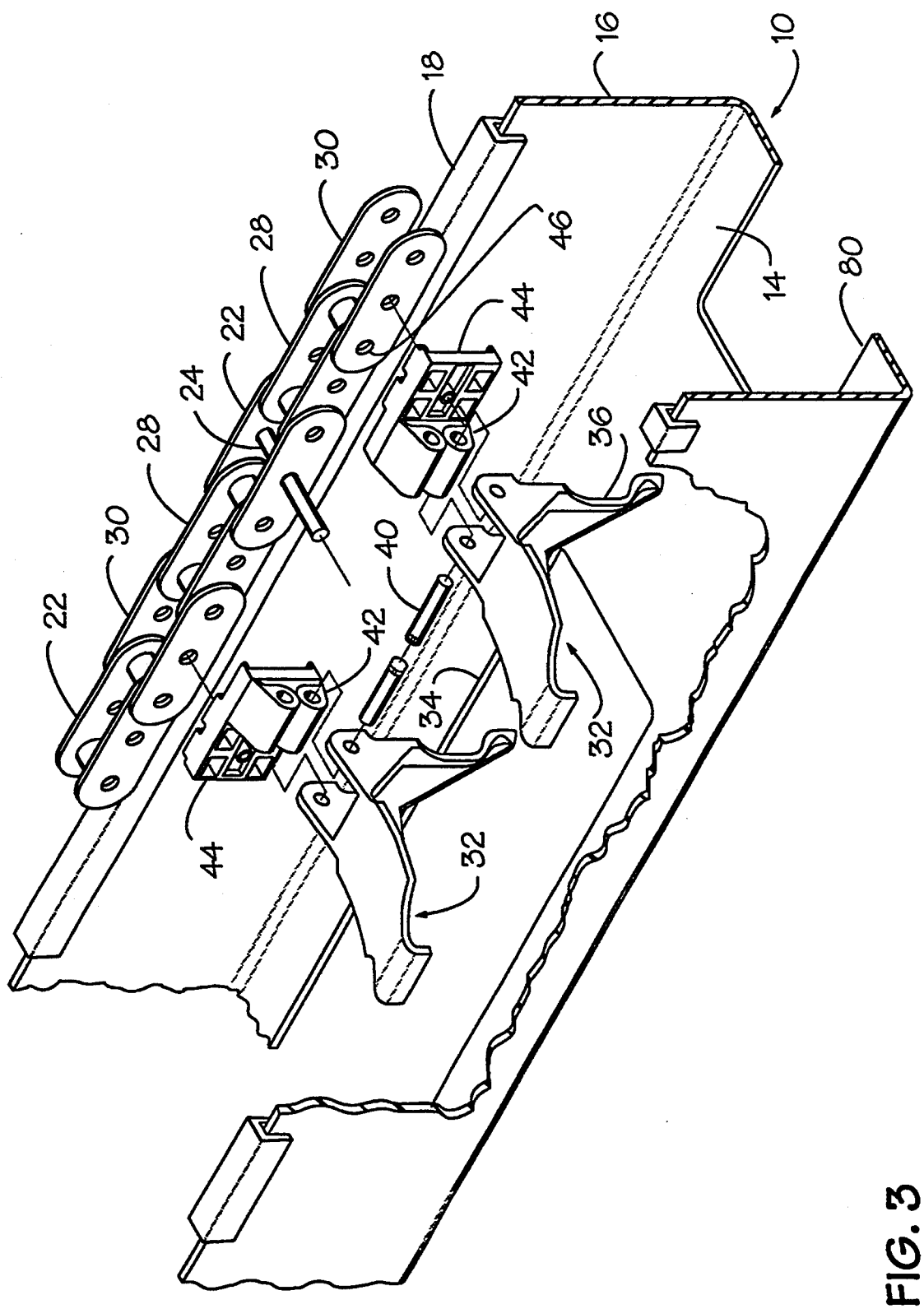
FIG. 3 is a partially cut away exploded, perspective view of the interior of a portion of the conveyor shown in FIG. 2 with elements removed illustrating in exploded view the assembly of two adjacent ejector fingers.

We now turn to FIG. 3. A perspective view of the inside of channel 12 is illustrated in partially cut away view with spools 26 removed. Finger 32 is comprised of an upper arm 34 and lower arm 36. Upper arm 34 is adapted to make contact with the object or fruit that is carried within pockets between adjacent pairs of spools 26 in conveyor system 10 while lower arm 36 is driven by a solenoid assembly 38 shown in FIG. 2 and described below in greater detail in connection with FIGS. 4-6. Ejector finger 32 is pivotally coupled about a pin 40 disposed within a bore 42 of bracket 44. Bracket 44 in turn is fixed or connected to chain link 30. Bore 42 is offset with respect to the connection of bracket 44 to link 30 such that ejector 32 is approximately centered between two adjacent spool links 22 and in particular is generally aligned with the common pin 46 connecting chain links 28 and 30.

Figure 4:
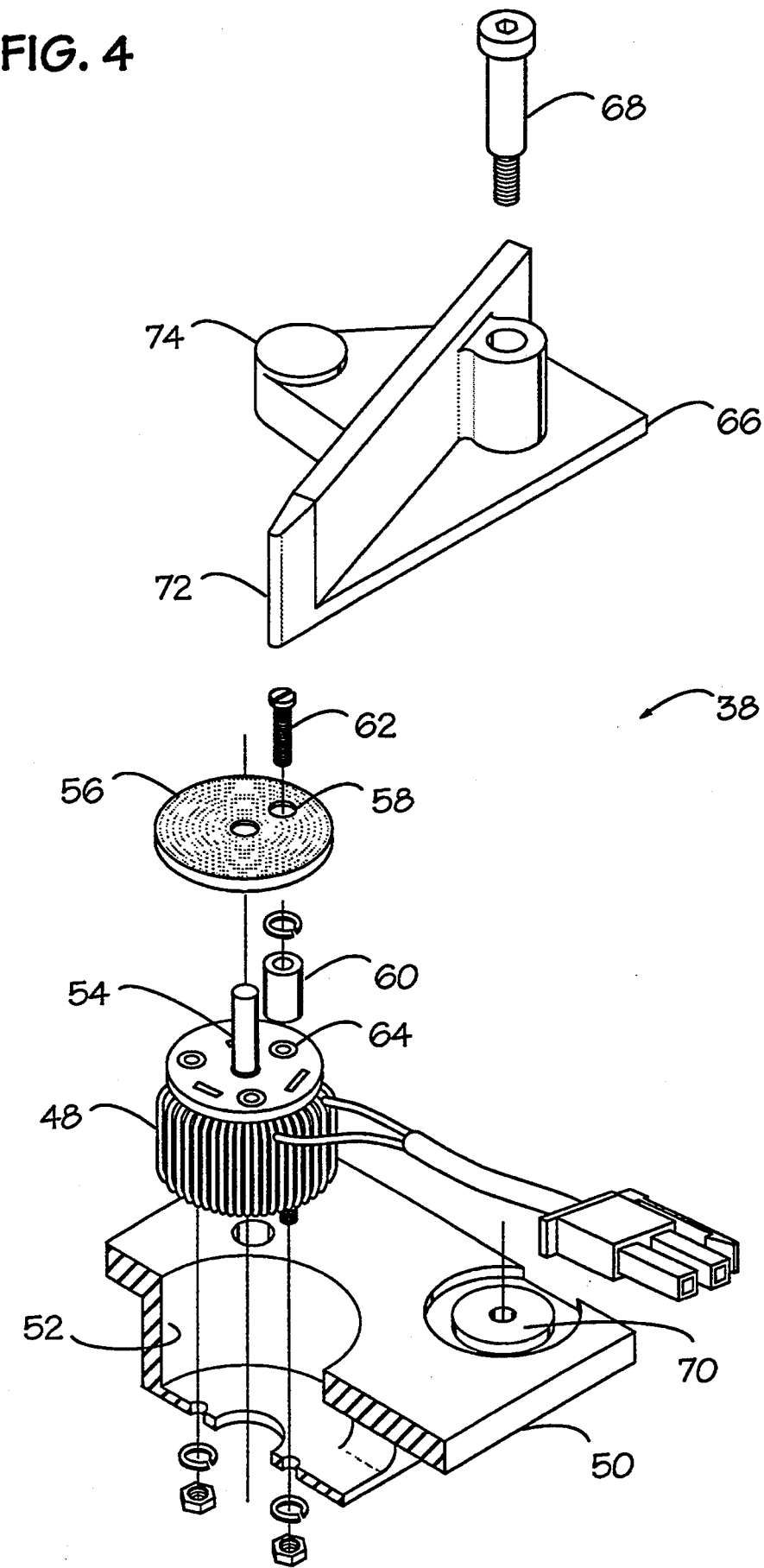
FIG. 4 is an exploded perspective and partially cut away view of a cam solenoid assembly used as the motive power for the ejecting finger in FIGS. 2 and 3.
Figure 6:
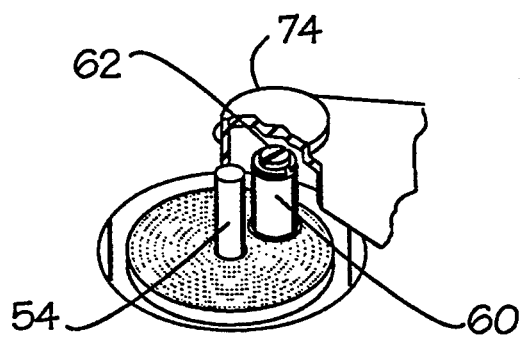
FIG. 6 is a perspective view in enlarged scale of a portion of the cam solenoid assembly of FIG. 5 illustrating the relationship between the rotating cam and rotary solenoid.

We turn now to FIG. 4 which shows a partially cut away exploded perspective view of solenoid assembly 38. Solenoid assembly 38 is comprised of a rotary solenoid 48 which is bolted to a solenoid housing 50 within a recess 52 defined therein. Rotary solenoid 48 includes an output drive shaft 54 which is rotatably disposed within a solenoid dust cover 56. Dust cover 56 includes a hole 58 defined therethrough, through which a rotating cam sleeve 60 extends. As shown in FIG. 6, cam sleeve 60 is secured to a rotating head of solenoid 48 by means of a screw 62 concentrically disposed through sleeve 60 and screwed into a threaded bore 64 defined in the rotating head of solenoid 48.

A cam lever 66 is rotatably coupled to solenoid housing 50 by means of a fixed pivot screw 68 which is threaded into a threaded bore 70 defined in solenoid housing 50 as best depicted in the exploded view of FIG. 4. Cam 66 includes a cam driver lever 72 which is arranged and configured to contact and drive lower arm 36 of ejector finger 32. Cam driver lever 72 is integral with a cam follower 74.

Figure 5:
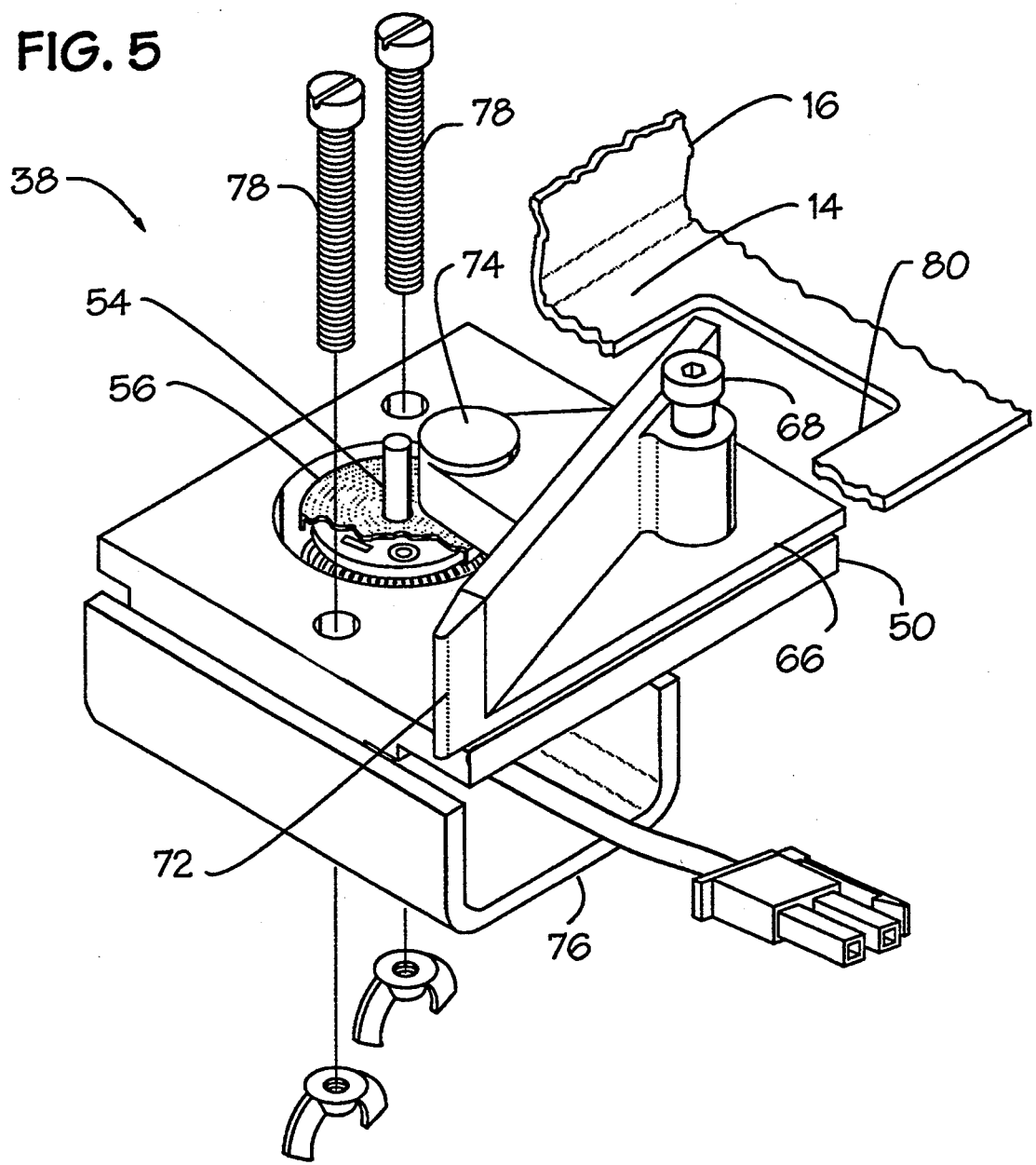
FIG. 5 is a perspective view of the assembled cam solenoid assembly of FIG. 2 shown attached to the conveyor and shown in partially exploded view.

The parts shown in exploded view in FIG. 4 are shown in assembled view in the perspective partially cut away view of FIGS. 5 and 6. Solenoid housing 15 is bolted to an underlying U-bracket 76 through a pair of screws 78 which extend though a slot 80 defined in bottom wall 14 of channel 12. Cam follower 74 is shown in the enlarged partially cut away perspective view of FIG. 6 as captively enclosing sleeve 60. Thus, as rotary solenoid 48 operates, dust cover 56 and sleeve 60 will rotated in a clockwise or counterclockwise direction thereby rotating cam follower 74 in a clockwise or counterclockwise direction about pivot pin 68 and thus operating cam lever 72. Cam lever 72 then comes in contact as previously stated with lower arm 36 of ejector finger 32 causing the upper arm 34 to rotate about pivot pin 40 and to selectively eject any object or fruit lying above ejector 32 in the interspool space between the adjacent spool links 22 under which ejector 32 has been centered.

FIG. 7 is an exploded perspective view of a spool pin chain and ejector sensor assembly generally denoted by reference numeral 82. Chain and ejector sensor assembly 82 is comprised of a fixing bracket 84 by which the assembly is connected by conventional means to channel 12 at an appropriate location in conveyor system 10 such as shown in FIG. 1. Ejector detector 86 is mounted to bracket 84 and provides a detection signal from an activated ejector which is swung up into the detection beam as it passes detector 86. Ejector 32 is activated at the detection station by a selectively activated solenoid, and by this means any missing ejector 32 on conveyor 10 can be detected by running the unloaded conveyor past detector 86 for one complete cycle. The conveyor is then stopped at a predetermined time after detection of a missing ejector to bring the location of the missing ejector into a predetermined inspector and repair station where access and inspection is facilitated.

Detector 87 is in the shape of a U with a sending and receiving unit on opposite sides of the U. Spool pins 24 extend outside the chain beyond the outer side wall 16 of channel 12 and pass within the U of detector 87.

Detectors 86 and 87 may be microswitches, photooptical, magnetic or any other type of sensors capable of detecting the passage of an identifiable object, such as an ejector arm or a periodic position on the chain, such a spool pins 24. A second, substantially identical detector to detector 87 is similarly disposed on conveyor 10 at or near the opposing end to measure the change in chain length over time by the loss of simultaneity of the chain pin detection events. Thus, detector assembly 82 provides a basic means for detecting a missing ejector, measuring the actual timing of the chain and the average interspool distance even if that distance many change due to temperature and wear.

FIG. 8 is a perspective view of fruit counter or over-the-end detector assembly 88 shown in isolation of other elements in conveyor system 10 as shown in exploded perspective view. Sensor 88 detects or counts the passage of objects or fruit on the conveyor passing off the return end of the conveyor as shown in FIG. 1. Fruit detector assembly 88 is comprised of a mounting bracket 90 for fixing opposing detector elements 92 on opposite sides of channel 12 between which elements 92 the fruit passes. A sensing beam between sensors 92 is broken to allow detection of a passing fruit down the conveyor. Assembly 88 is located at the end of the line and thus detects fruit which has for any reason not been ejected while being carried down the line and which is carried over the end of the conveyor into a return bin or conveyor, not shown.

THE CONVEYOR SYSTEM ELECTRONIC CONTROL CIRCUITRY

Figure 9:
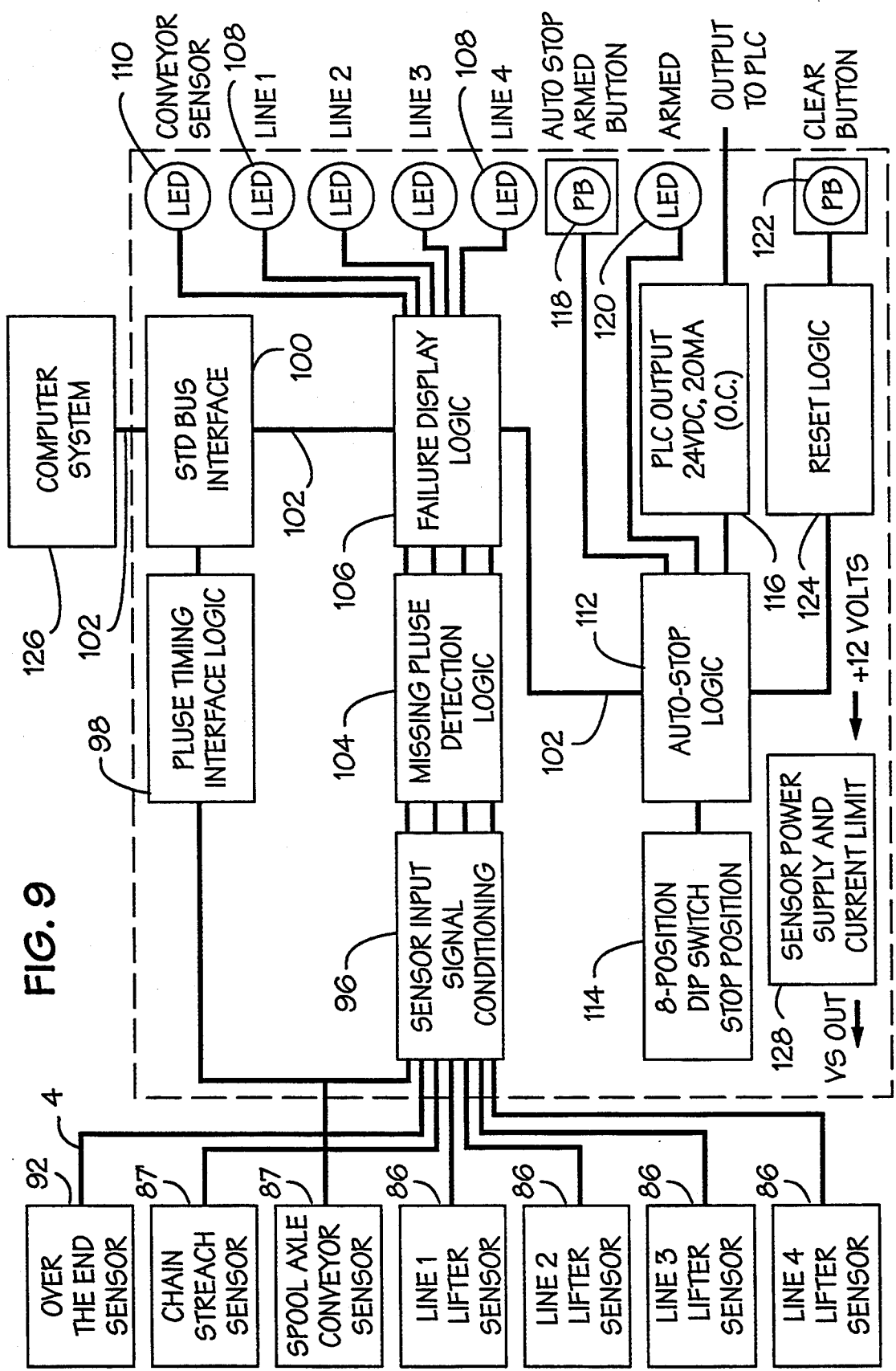
FIG. 9 is a block diagram of the control circuitry used in combination with the conveyor elements shown in FIGS. 1-8.

FIG. 9 is a block diagram of a circuit for controlling in a conveyor system 10 such as shown in FIGS. 1-8. The circuit of FIG. 9 is designed to control and monitor four parallel conveyor lines such as described in FIGS. 1-8. Clearly, any number of parallel lines could be accommodated by system 10 as modified according to the teachings of this specification. Ejector sensors 86 are each coupled to a sensor input signal conditioning buffer 96 which transforms the detection signal from sensors 86 into a electrical format and level compatible with the digital circuitry of FIG. 9. Buffer 96 includes for example filters to reduce noise which may be picked up on the long wire lines to sensors 86, 87, 87' and 92 and to reshape the detection signals into a format which is specified or required by the digital and control circuitry in or coupled to the circuit of FIG. 9.

Similarly, the chain or spool axle sensor 87 described in connection with FIG. 7 provides spool axle detection signals to both buffer 96 and a pulse timing interface logic circuit 98. Chain stretch sensor 87' and over-the-end sensor 92 are also coupled to sensor input signal conditioning buffer 96, filtered and conditioned in a manner similar to the processing of lifter detectors 86. The operation of chain stretch sensors 87 and 87' and over-the-end sensor 92 will be described in greater detail below.

The timing signal of logic circuit 98 is provided to a conventional or standard bus interface circuit 100 and then provided as a time data input to a conventional digital bus 102. Logic circuit 98 uses an internally crystal controlled clock signal to provide a time marking byte to bus 102 which marks the time at which a spool pin was detected. Standard bus interface circuit 100 provides the internal crystal controlled clock for use in timing interface logic circuit 98 to provide the spool pin timing mark for use in an external computer system 126 to which bus 102 is coupled.

The ejector signals provided through buffer 96 are received by a missing pulse detection logic circuit 104. Missing pulse detection logic circuit 104 measures the time interval between the lifter signals from sensors 86 to determine if any one of the four lifter signals is missing. The lifter signal is detected as missing by circuit 104 if the time interval between the lifter signals exceeds a predetermined maximum. In the illustrated embodiment the four lines are synchronized by the fact that the lines are driven by a common motor and drive sprocket wheel. Therefore, the four lifter signals are nearly simultaneous. If any one of them is too late, it is assumed that an ejector is missing and what was detected as the next signal was a following lifter.

If an ejector has been detected as missing, logic circuit 104 will generate an appropriate output signal indicating from which one of the multiple lines the ejector is missing. The missing ejector signal output by logic circuit 104 is then coupled to a failure display logic circuit 106, which serves to drive a selected one of a plurality of output LEDs 108. One of the LEDs is selectively lit to indicate which of the multiple lines has an ejector missing.

Similarly, any loss of a spool pin 24 causing a detection signal from sensor 87 will similarly be detected by logic circuit 104 and displayed on a conveyor LED 110 driven by failure display logic circuit 106.

The detection of a missing ejector is provided on bus 102 to an autostop logic circuit 112. According to a fixed digital input from a dip switch 114, autostop logic circuit 112 provides an output to a motor controller circuit 116, which will stop the conveyor system at a predetermined location, or more particularly at a predetermined number of spool pin counts later. The spool pin count is coupled to autostop logic circuit 112 through bus 102. The location at which conveyor system 10 stops will depend upon the command signal provided to an optical coupler 160 connected to a conventional programmed logic motor controller, not shown. An output signal through optical coupler 160 is triggered by the occurrence of a ejector failure detection and determined by the value input into dip switch 114. Optical coupling is used for increased noise isolation between the motor controller and the circuit of FIG. 9 as well as to provide a convenient means for coupling the digital signal levels of the circuit of FIG. 9 to the higher 24 volt DC signal levels in the motor controller.

Enablement of autostop logic circuit 112 is provided through a push button switch 118 and the arming or enablement of autostop logic circuit 112 is indicated by LED 120. Once the conveyor system 10 has been stopped and the missing ejector has been repaired, the conveyor system can be restarted by activation of a clear push button 122, which triggers reset logic circuit 124, which resets or reinitializes autostop logic circuit 112 and permits conveyor system 10 to become operative. A search may then be made for additional missing ejectors by repeating the above steps.

METHOD FOR DETECTING MISSING EJECTORS

The circuitry for controlling conveyor system 10 now having been described, we consider in more detail the method of detecting and repairing a missing ejector used in the circuitry described above. Missing ejector sensor 86 is mounted on the end of conveyor 10 typically just past the last solenoid assembly 38. Sensor 86 is positioned so that when ejector 32 is activated and upper arm 34 swings up, it is detected by sensor 86. Missing ejectors are detected by first operating conveyor system 10 in a manual mode before running fruit. The operator first starts conveyor system 10 with no fruit. By selecting the missing ejector test, a selected solenoid assembly 38 fires continuously to lift each ejector 32 up as is passes into the position where it can be detected by missing ejector sensor 86. Clear button 122 is pressed and if any ejectors 32 are missing, LEDs 108 will light indicating in which conveyor line the missing lift occurs. Pressing arm button 118 will then cause autostop logic circuit 112 to stop conveyor system 10 in the appropriate position to allow repair of the missing ejector. The indicated failure of all ejectors 32 will, of course, be indicative of a failed solenoid assembly 38 which is selected for use with sensor 86.

Because of the large number of ejectors within conveyor system 10, it is important to the efficient maintenance and operation of conveyor system 10 to stop conveyor 10 with the failed ejector at a predetermined location, thereby relieving the operator of having to visually inspect many hundreds of ejectors to find the one which has failed. Furthermore, the missing or damaged ejector is always stopped in a position of conveyor 10 in which access is readily available to facilitate repair and replacement.

Positioning of a missing ejector can be accomplished according to the invention either in a manual mode or automatic mode. In the manual mode, the operator pushes clear button 122 in FIG. 9 and observes LEDs 108 for failure or missing ejector. If an ejector 32 is missing, one of the LEDs 108 will stop blinking and remain continuously lit. A missing chain pin on one of the spools will be indicated by LED 110 being lit. Clear button 122 is again pressed and arm button 118 pressed. Arm LED 120 will then be lit. Conveyor 10 automatically stops when the failed ejector or spool pin has reached a predetermined location set by dip switch 114.

In an automatic mode, the ejector status is monitored and cleared once each minute by a off-board computer system 126 coupled to bus 102. A warning message is displayed if a missing ejector is detected. The operator will then press a function key at the input terminal to the off-board computer system 126 to arm the conveyor stop. Conveyor 10 automatically stops when the failed item reaches a predetermined location.

METHOD FOR DETECTING OVER-THE-END FRUIT

In the automatic mode, fruit falling over the end of the conveyor system 10 is also detected. If fruit was not intended to go over the end of conveyor 10, the software program used in the invention determines the type of failure and sets the status code to be read by the off-board computer system 126. In FIG. 9, over-the-end sensor 92 is shown for emphasis as being coupled through circuits 96 and 104 to bus 102 and hence to the off board computer system 126. However, in the preferred embodiment over-the-end sensor 92 is separately interfaced into the off board computer system 126 independently from the control circuit of FIG. 9 by conventional means.

Over-the-end sensor 92, such as shown in FIG. 8, is placed at the very end of conveyor system 10. According to the normal operation of conveyor system 10, the fruit should be graded and sorted and ejected at some point in the conveyor to an appropriate side bin 31. If all the fruit has been appropriately processed, none of the fruit should exit off the end of the conveyor. The over-the-end sensor 92 is coupled to sensor input signal condition circuit 96 and conditioned in a manner similar to the other sensor inputs. In this way, solenoid failures can also be detected as well as ejector failures.

The operation is as follows. A program checks photo-electric sensor inputs as the fruit is running, which checking is done as a low priority interrupt from grading functions and other operations to which the computer system 126 must attend. Failure is noted when fruit goes over the end of conveyor 10 when this is not intended. If fruit is escaping once per revolution of conveyor 10, then the failure indicated is a missing ejector 32. If the fruit which is escaping is all from the same solenoid location of conveyor 10, then a bad solenoid is identified. If, however, there are multiple escaping fruit from different solenoids, then the error indication is a missing chain pin. A status code is then set to indicate the conveyor line and the type of failure which has been detected. A warning message is displayed on the screen. The operator then selects an ejector repair function from the keyboard that automatically stops conveyor 10 when the failed item is at a repair location.

THE METHOD FOR DETECTING AND ADJUSTING CHAIN STRETCH

A chain stretch sensor 87' is placed at the end of conveyor system 10, while conveyor sensor 87 is placed at or near its beginning, which is also used as a spool pin or chain speed signal. Thus, a substantial part of the entire run of conveyor 10 extends between conveyor sensor 87 and chain stretch sensor 87'. In FIG. 9 chain stretch sensor 87' is shown for emphasis as being coupled through circuits 96 and 104 to bus 102 and hence to the off board computer system 126. However, in the preferred embodiment chain stretch sensor 87' is separately interfaced into the off board computer system 126 independently from the control circuit of FIG. 9 by conventional means.

Both sensors 87 and 87' sense spool pins 24. When initially installed, chain stretch sensor 87' and conveyor sensor 87 are positioned on conveyor system 10 such that a spool pin 24 triggers each sensor 87 and 87' simultaneously or nearly simultaneously. Therefore, as long as conveyor system 10 has the same length over time, simultaneously signals will be obtained between chain stretch sensor 87' and conveyor sensor 87. However, as the chain stretches or wears, the detection made by sensors 87 and 87' will begin to be displaced in time. When the chain stretch exceeds an allowed limit, conveyor sensor LED 110 is activated through failure display logic 106 in response to an error signal communicated on bus 102 from the off-board computer system 126. This will advise the operator to reset each of the locations of solenoid assemblies 38 to realign them with ejectors 32 in a now slightly stretched chain.

Chain pin sensor 87', which is usually mounted at or near the missing ejector detector assembly 86, is used in conjunction with conveyor sensor 87 located at an optics housing where the fruit is graded at the opposing end of the line.

A typical chain stretch measurement is as follows. When conveyor 10 is installed, conveyor sensor 87 and chain stretch sensor 87' are adjusted so that a chain pin 24 is seen at the same time. As the chain stretches, chain stretch sensor 87' at the end of conveyor 10 will see a chain pin 24 earlier than conveyor sensor 87 next to the optics housing at the opposing end of conveyor system 10. A count is stored in a chain stretch counter in the off-board computer system to measure the interval between the detection time at chain pin sensor 87' versus conveyor sensor 87. At a conveyor interrupt time, the program reads the chain stretch counter to measure the amount of stretch. When the stretch exceeds the allowed limit, for example about 0.75 inch or 30 counts, the operator is notified to readjust all the solenoid locations and reset conveyor pin sensor position. The sequence is then continually repeated to monitor chain stretch. The off-board computer system 126 will display the amount of stretch in inches in each conveyor line in the system. Warning messages are displayed when the chain stretch exceeds the allowed limit for each conveyor line. An average number of readings is taken to calculate an accurate value of the chain stretch.

Alternatively, the solenoids are left in place and their timing is changed. The amount of chain stretch is determined, and from the amount of stretch new firing times of each of the solenoids are automatically computed in off-board computer system 126. The firing times will advance because the chain is now longer and the spool pocket arrives at the fixed locations of the ejector solenoids sooner, and because the chain is driven at a constant link per second rate which causes the linear rate of displacement to increase as link length increases.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

We claim:

1. An apparatus for the detection of malperformance in a conveyor system used for sorting objects comprising:
   a plurality of ejectors carried by said conveyor system for selectively ejecting objects from said conveyor system;
   a solenoid assembly for activating selected ones of said plurality of ejectors;
   a missing-ejector sensor disposed proximate to said conveyor system for detecting activation of said plurality of ejectors by said solenoid assembly; and
   computer means for controlling said conveyor system to selectively position one of said plurality of ejectors detected by said missing-ejector sensor if said ejector has malperformed,
   whereby malperforming and missing ejectors can be identified and positioned for access.

2. The apparatus of claim 1 wherein said computer means controls said solenoid assembly in said conveyor system so that each of said plurality of ejectors is sequentially tested for operation and its performance detected by said missing-ejector sensor.

3. The apparatus of claim 1 where said conveyor system has an end and a plurality of said solenoid assemblies, said apparatus further comprising an over-the-end sensor disposed proximate to said conveyor system to detect objects passing over said end of said conveyor, and wherein said computer means is coupled to said over-the-end sensor to determine, by periodicity and timing of objects detected by said over-the-end sensor, which one of said plurality of solenoid assemblies or ejectors is malperforming.

4. The apparatus of claim 3 wherein said computer means controls a selected one of said plurality of solenoid assemblies in said conveyor system so that each of said plurality of ejectors is sequentially tested for operation and its performance detected by said missing-ejector sensor.

5. The apparatus of claim 1 wherein said conveyor system further comprises a chain carrying said ejectors, said chain includes a plurality of periodically spaced indicial pins, said apparatus further comprising a chain stretch sensor for detecting said indicial pins and a reference sensor for detecting said indicial pins, said reference sensor being disposed in said conveyor system at a reference position relative to said chain stretch sensor, and wherein said computer means initially establishes a timing between detections by said chain stretch sensor and said reference sensor of said indicial pins, said computer means continuously monitoring said timing between said chain stretch sensor and reference sensor to detect changes in said timing indicative of chain stretch.

6. The apparatus of claim 5 wherein said chain stretch sensor and reference sensor are disposed in said conveyor systems so that said indicial pins are substantially simultaneously sensed by said chain stretch sensor and reference sensor, any departure from simultaneity indicating chain stretch.

7. The apparatus of claim 5 wherein said computer means further compares said timing against an alarm limit and generates an alarm when said limit has been reached.

8. The apparatus of claim 7 further comprising a plurality of said solenoid assemblies for activating said ejectors at a corresponding plurality of sorting positions within said conveyor system, said computer means providing an activating signal to each of said plurality of solenoid assemblies to selectively operate said ejectors at each of said sorting positions within said conveyor system, said computer means responding to said alarm to retime activation of each of said solenoid assemblies in response to chain stretch.

9. The apparatus of claim 3 wherein said conveyor system further comprises a chain carrying said ejectors, said chain including a plurality of periodically spaced indicial pins, said apparatus further comprising a chain stretch sensor for detecting said indicial pins and a reference sensor for detecting said indicial pins, said reference sensor being disposed in said conveyor system at a reference position relative to said chain stretch sensor, and wherein said computer means initially establishes a timing between detections by said chain stretch sensor and said reference sensor of said indicial pins, said computer means continuously monitoring said timing between said chain stretch sensor and reference sensor to detect changes in said timing indicative of chain stretch.

10. The apparatus of claim 9 further comprising a plurality of said solenoid assemblies for activating said ejectors at a corresponding plurality of sorting positions within said conveyor system, said computer means providing an activating signal to each of said plurality of solenoid assemblies to selectively operate said ejectors at each of said sorting positions within said conveyor system, said computer means responding to said alarm to retime activation of each of said solenoid assemblies in response to chain stretch.

11. A method for detecting missing ejectors in a conveyor system for sorting objects comprising the steps of:
   activating each of said ejectors at a predetermined position within said conveyor system;
   detecting the activation of each of said ejectors at said predetermined position; and
   controlling said conveyor system to position a selected ejector at a predetermined repair position when failure of proper activation is detected,
   whereby operability of said plurality of ejectors within said conveyor system is quickly and easily determined with said conveyor system being configured to permit immediate inspection and repair.

12. The method of claim 11 wherein said conveyor system has a plurality of sorting positions and further comprising the steps of:
   detecting objects disposed over an end of said conveyor system; and
   determining timing and periodicity of detection of said over-the-end objects to identify which one of said plurality of sorting positions is malperforming.

13. The method of claim 11 further comprising the step of detecting chain stretch within said conveyor system, said plurality of ejectors being carried by a chain within said conveyor system.

14. The method of claim 13 wherein said conveyor system has a plurality of sorting positions and further comprising the steps of:
   detecting objects disposed over an end of said conveyor system; and
   determining timing and periodicity of detection of said over-the-end objects to identify which one of said plurality of sorting positions is malperforming.

15. The method of claim 13 further comprising the steps of:
   selectively activating said plurality of ejectors on said conveyor system with a predetermined timing to sort said objects at a plurality of predetermined sorting positions within said conveyor system; and
   selectively altering said timing of activation of said plurality of ejectors according to detection of said chain stretch.

16. The method of claim 15 wherein said step of selectively altering said timing is performed simultaneously with operation of said conveyor system.

* * * * *